United States Patent [19]

Eustacchio

[11] 4,225,301

[45] Sep. 30, 1980

[54] PLANT FOR PRODUCING FIRED BRICK BLANKS

[75] Inventor: Claudio Eustacchio, Graz, Austria

[73] Assignee: Fuchs & Co. Aktiengesellschaft fur Elektro-Draht-Erzeugung und Maschinenbau, Graz, Austria

[21] Appl. No.: 939,039

[22] Filed: Sep. 1, 1978

[30] Foreign Application Priority Data

Dec. 30, 1977 [DE] Fed. Rep. of Germany ....... 2758847

[51] Int. Cl.³ .............................................. B28B 15/00
[52] U.S. Cl. ...................................... 425/88; 264/57; 264/58; 264/66; 425/115; 425/143; 425/190; 425/306; 425/508; 425/516
[58] Field of Search ................. 425/88, 508, 510, 516, 425/114, 115, 142, 143, 170, 190, 202, 547, 553, 306, 314; 264/57, 58, 65, 66

[56] References Cited

U.S. PATENT DOCUMENTS

| | | | |
|---|---|---|---|
| 1,117,853 | 11/1914 | Jordan | 264/57 |
| 2,245,181 | 6/1941 | Brooks | 264/58 |
| 3,268,637 | 8/1966 | Cremer | 264/58 |
| 3,499,069 | 3/1970 | Seigle | 425/88 |

FOREIGN PATENT DOCUMENTS 585980 12/1977 U.S.S.R. .................................. 425/88

*Primary Examiner*—Donald J. Arnold

*Attorney, Agent, or Firm*—Allison C. Collard; Thomas M. Galgano

[57] ABSTRACT

The invention relates to an installation or plant for making sintered brick blanks, which includes a material preparation plant, a press and molding device, a drying and sintering device, a discharge device and feeding means, as well as a central power source, and control and monitoring devices. The material consisting, for example, of clay, loam, clay marl with aluminum oxide and liquid medium, is prepared in the material preparation device and is formed into a strand by means of an extruder in the form molding device. The strand is then cut into brick blanks by means of a strand cutter and a wire cutter. The brick blanks are transferred with suitable transfer means and a displacement device in a defined, spaced-apart relationship, onto a transfer truck and from there onto a drying and sintering truck. A plurality of drying and sintering trucks run in a closed series through a tunnel dryer at an optimum speed for the drying process. After the discharge of the trucks from the tunnel dryer, the trucks with the pre-dried brick blanks are moved back in accordance with a counterflow principle, through a sintering furnace, which is above the tunnel dryer. After the sintered brick blanks are discharged from the sintering furnace, they are fed to the discharge means by another transfer truck, and are then removed in groups from the truck, whereby the truck is moved back to the loading station by means of an elevator.

18 Claims, 3 Drawing Figures

PLANT FOR PRODUCING FIRED BRICK BLANKS

The invention relates to a plant for producing fired brick blanks.

Blanks or hollowware in the brick industry are produced in different process sections or parts of a plant which are spatially separated and operate functionally independently of each other. The blanks must be reloaded, stored, set in special arrangements and subjected to intermediate treatment between the individual parts of the plant before they can be supplied to the dryer and to the kiln.

Accordingly, there is not only a loss of time due to transportation from one system to the next system, but additional transportation means, setting grippers and the like are required, which increase the manufacturing costs. Furthermore, timing between the individual processing operations is matched only in rare cases, so that parts of the plant fail at times. Finally, energy utilization of the kilns is poor, because the plants are operated independently of each other.

It has previously been proposed to set the blanks in large stacks on the kiln truck to improve the overall efficiency of the plant. Special setting grippers are used for this purpose, which set the blanks, supplied successively, at a specific distance from each other and then stack them, by alternate setting, on the drying truck. The disadvantage of this plant is that the setting devices and stacking devices are technologically complex and therefore trouble-prone. Since the freshly molded bricks are normally very soft, they cannot be set into stacks. Setting wet, freshly-molded bricks into stacks is possible only in exceptional cases by the so-called strip molding process. Furthermore, if the stacks cannot be precisely set, they can collapse due to drying shrinkage, which, on the one hand, involves the disadvantage of interrupting the drying operation and the production of rejects and, on the other hand, causes damage to the expensive refractory walls when the stacks topple.

Dryers and kilns must therefore be provided with special protective devices, or must be more strongly constructed so that such toppling of stacks does not cause the entire kiln to fail for a prolonged period of time.

It is another disadvantage of the plant described hereinbefore that, depending on charging, the energy requirements vary, so that constant monitoring and readjustment is necessary to ensure efficient operation. This results in a further disadvantage due to the fact that control and monitoring of conventional plants calls for a great deal of personnel, a feature which has a detrimental effect on the overall cost calculation.

It is therefore the object of the present invention to improve a plant of the kind described hereinbefore by matching the operation and design of the individual plant components to each other, so that the overall efficiency is increased, the operation is streamlined to the extent that the entire plant can be operated by less personnel, and soft bricks can be set directly on the kiln truck and can traverse through the dryer and the kiln, without the intermediate reloading operation, which is otherwise necessary.

The plant, according to the present invention for producing fired brick blanks, is characterized by a material processing system, a molding and shaping system, a drying and firing system and an unloading system, and the individual systems are interconnected by stationary and/or movable conveying devices to form a processing line, which permits continuous operation with processes which follow each other directly. Advantageously, the material processing system comprises a material conveying system, a reducing system, a mixing system and a material store, all of which are connected to each other by means of conveyor belts. The molding and shaping system advantageously comprises an extrusion press, followed by a strand cutter, which is followed by a multiwire cutter, while the drying and firing system is formed by a tunnel dryer and a tunnel kiln. The tunnel dryer and tunnel kiln are advantageously combined with each other in a common casing, so that the transfer systems for the blanks can pass through the tunnel dryer and then through the tunnel kiln via a counterflow principle. Advantageously, the tunnel dryer and the tunnel kiln are arranged one above the other in the interests of space saving. The capacity of the tunnel dryer and of the tunnel kiln can be increased by providing multi-row channels, one channel of the tunnel dryer being associated with one channel of the tunnel kiln, and/or by corresponding lengthening of the channels. The channel height itself is minimized, advantageously, so as to accommodate one conveying system with only a single setting layer. This dispenses on the one hand with complicated setting grippers, because stacks are no longer used and, on the other hand, it avoids the risk of the stacks collapsing due to drying and firing shrinkage, which lead to failure of the dryers or kilns. Toppling over of the stacks can also damage the sensitive refractory lining of the kiln, which also causes the kiln to fail. Kilns with high channel walls must therefore be constructed more strongly and have a thicker refractory lining, so that they are more expensive when compared with kilns which have channels in accordance with the present invention. The single layer position of the blanks on the conveying systems also leads to an improvement of drying and firing, because the hot air is able to flow uniformly through the blanks and can penetrate immediately into the interior thereof. In this way, the drying time and firing time can be advantageously shortened.

According to another advantageous feature of the present invention, an air circulating system is provided between the tunnel kiln and the tunnel dryer, and is advantageously operated by fans which conduct the hot firing gases of the tunnel kiln by counter-flow or parallel-flow into the tunnel dryer, in dependence on the drying sensitivity of the blanks. The counter-flow principle is preferred for blanks which are sensitive to drying, because the fresh blanks supplied on the inlet side of the dryer are not subjected to the hot drying air, but to drying air which is relatively cool in dependence on the kiln length, while the parallel-flow principle is preferred for blanks which are not sensitive to drying, as this leads to more rapid drying of the blanks.

Owing to the inventive combination of the tunnel dryer and the tunnel kiln, the hot combustion gases can be utilized for drying the blanks, which are introduced into the dryer, so that the energy consumption of the entire plant is substantially reduced. Furthermore, complicated monitoring and control of the drying kiln and firing kiln is obviated because the conveying devices, loaded with the blanks, pass through both kilns continuously, so that the same operating conditions always occur during drying and firing, and both process stages are constantly matched to each other. The plant can therefore be continuously operated with less personnel and a substantial reduction in energy consumption.

A further advantageous embodiment of the subject of the present invention provides that a push-off device and a transfer system, as well as a distribution system, is provided between the molding and shaping system, and a combined distribution and elevator system is provided between the tunnel dryer and the tunnel kiln at the charging end of the tunnel kiln. Advantageously, the transfer system can be formed by combined drying and kiln trucks and the distribution system can be formed by a transfer truck, on which the drying and kiln trucks can move. The transfer truck, each of which is loaded with a drying and kiln truck, moves the latter transversely to the feed direction of the drying-kiln truck to a corresponding channel of the tunnel dryer, in order to charge the latter therewith. To this end, the transfer truck is supported, so as to traverse on a guide truck extending transversely to the direction of movement of the drying-kiln truck, and the channels of the tunnel dryer adjoin the guide track laterally. As a result, the drying-kiln trucks can be charged into the channels without the aforesaid trucks altering their direction of motion or their level.

Since the combined drying-kiln trucks must traverse through the tunnel dryer and subsequently through the tunnel kiln, they are covered with a refractory covering which has a grooved-shaped profiling on the top of the truck. Such groove-like profiling permits air circulation beneath the blanks stacked thereon, so that the blanks are subjected uniformly from all sides with hot air. For reasons of cost, the drying-kiln trucks consist of steel, which is attacked by the hot kiln gases, therefore the trucks are provided with lateral heat protection devices, more particularly, sand aprons, which can move together with the truck in guides, more particularly, sand troughs, in the feed direction. The individual trucks are in contact at their end faces when the drying kiln is continuously charged with combined drying and kiln trucks, so that the sand aprons on the side provide continuous lateral protection, so that the steel bogie of the trucks is completely screened against the hot combustion gases. After leaving the tunnel dryer, the combined drying-kiln trucks are transferred into the associated channel of the tunnel kiln by means of a transfer truck, which is also constructed as an elevator, in order to pass through the kiln.

According to another advantageous feature of the present invention, the exit end of the tunnel kiln has an unloading system, which is provided with a setting gripper capable of gripping the entire layer of bricks on a drying-kiln truck and to arrange such layer in stacks on pallets.

As will be evident from the description hereinbelow, the plant, according to the invention, operates continuously with a high degree of efficiency, requires little energy and can be operated by a small amount of personnel. Some process steps of the plant operate fully automatically and some process steps, semi-automatically, and this will be described in detail hereinbelow.

Other objects and features of the present invention will become apparent from the following detailed description considered in connection with the accompanying drawing, which discloses a single embodiment of the invention. It is to be understood, however, that the drawing is designed for the purpose of illustration only and not as a definition of the limits of the invention.

In the drawing, wherein similar reference characters denote similar elements through the several views.

Figure 1:
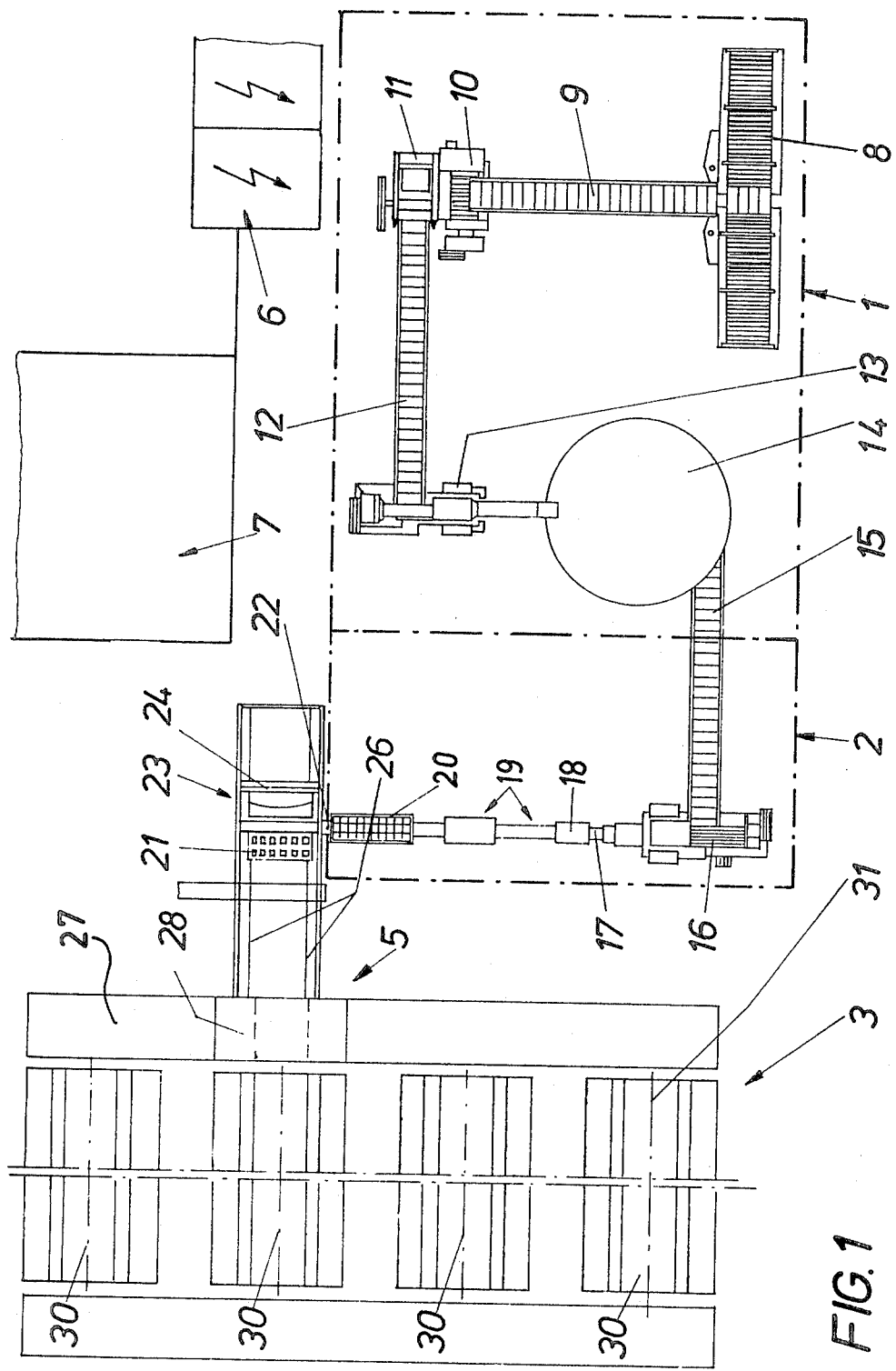
FIG. 1 is a schematic plan view of the plant according to the invention.
Figure 2:
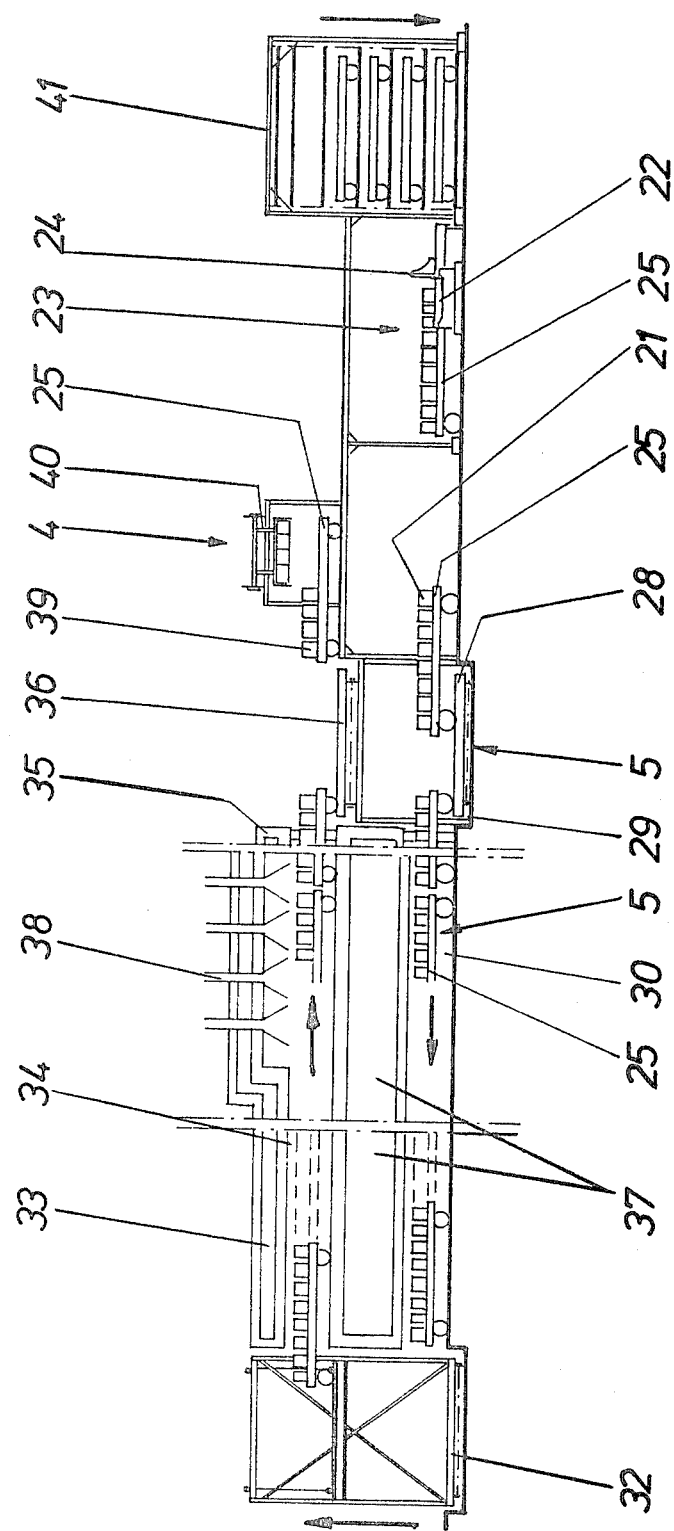
FIG. 2 is a partial side view of the plant shown in FIG. 1.

Referring now to the drawings and, in particular, to FIGS. 1 and 2 thereof, the plant according to the present invention for the production of fired bricks, comprises a material processing system 1, a molding and shaping system 2, a drying and firing system 3, an unloading system 4, conveying systems 5, an energy center 6 and control and monitoring means 7.

In FIG. 1, the material processing system 1 as well as the molding and shaping system 2, are surrounded by boxes in dash-dot lines.

The raw material used for producing bricks, for example, clay and the like, and clay marl, is mixed with alumina and flux and is supplied via the material conveying system 8 to the material processing system 1. From the material conveying system 8, the raw materials are transferred by means of a conveyor belt 9 to the reducing system 10 and to the high speed pag mill 11, where the raw material is then transferred by a conveyor belt 12 to a mixer 13, to which the additives are supplied. The prepared material is then stored in a silo or buffer 14, with the advantage that the plant can also be operated over the weekend, so that the continuity of production of bricks is ensured and a uniformly low energy requirement is simultaneously maintained.

The prepared material is supplied from silo 14 via a conveyor belt 15 to an extrusion press 16 which, in dependence on the choice of the particular die, extrudes the raw material into the desired molded blanks. The strand passes via a fall-off belt 17 to the strand cutter 18, and is cut thereby into strand portions of specific length. By means of a transfer device 19, the strand portion, cut to length, is accelerated and transferred to a multi-wire cutter 20. As soon as the front end of the strand portion reaches a sensor, the conveyor track of the multi-wire cutter 20 is stopped and the strand portion is divided by means of several adjacently disposed blades or cutting wires of the multiple wire cutter, into individual moldings or brick blanks 21, which are subsequently conveyed via a transfer device to a stretcher or spacing belt 22, which extends into the push-off system 23. Transfer is performed so that the brick blanks are arranged at a specific distance from each other on the stretcher belt 22. As soon as the first brick blank reaches a sensor, not shown, the stretcher belt 22 is stopped, a driver plate 24 and a combined drying-kiln truck 25 (see FIGS. 2 and 3) are driven so that the particular row of brick blanks can be pushed onto the truck and a second row is placed thereon at a specific distance; the brick blanks of the first row being in alignment with those of the second row.

As soon as the combined drying and kiln truck 25 is fully loaded with a corresponding setting layer of brick blanks 21, it will be moved along a guiding device 26 to a distribution platform 27 and driven on to a transfer truck 28 (see FIG. 2).

As can be seen more particularly by reference to FIG. 2, the transfer truck 28 is supported on the rails in a floor indentation 29, so that the top is in alignment with the guiding device 26, as well as with the guiding device disposed in the channels 30 of the tunnel dryer 31. The transfer truck 28 is therefore able to convey a drying and kiln truck 25 from the guiding device 26 to any desired channel 30 and to charge the channel with the truck.

The drying and kiln trucks 25 are uniformly moved forward in the channels 30 of the tunnel dryer 31 by means of known feed devices, and emerge at the end of the tunnel dryer. At that place, they are transferred to a second transfer truck 32, which is also constructed as an elevator and which raises the relevant drying and kiln truck 25 to the level of tunnel kiln 33. Since tunnel kiln 33 is situated directly above tunnel dryer 31, it is possible for drying-kiln truck 25, removed from channel 31, to be inserted into an associated channel 34 of tunnel kiln 33. It is, however, also feasible to transfer drying kiln truck 25 by means of transfer truck 32 to another channel, for example, if a different kind of brick is to be produced and, to this end, parts of tunnel dryer 31 and of tunnel kiln 33 are to be operated at different temperatures, and with different feed rates.

In tunnel kiln 33, the combined drying-kiln trucks 25 move by counterflow to the feed device in tunnel dryer 31, so that they again emerge at front end 35 of tunnel kiln 33, and from there are transferred by means of third transfer truck 36 to the unloading system 4. Between tunnel kiln 33 and tunnel dryer 31, there is provided an air circulating system 37, whose fans conduct the hot combustion gases produced by the burners 38 of tunnel kiln 33, into tunnel dryer 31, either by counterflow or by parallel flow, in dependence on the drying sensitivity of the blanks. In unloading system 4, the dried and fired bricks 39 are gripped by means of a setting gripper 40 and deposited in stacks on pallets (not shown). Unloaded drying and kiln truck 25 is then driven into elevator 41 and returned to push-off system 23. This, therefore, provides a closed circuit for the trucks.

Figure 3:
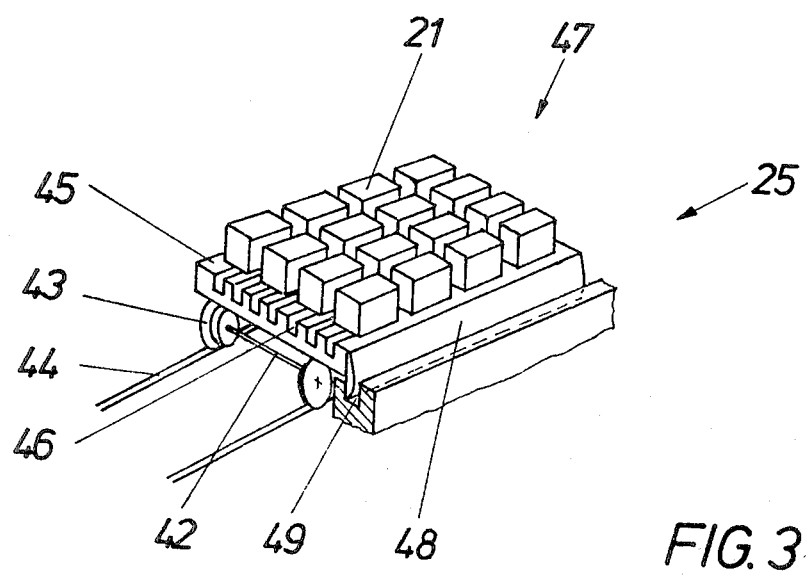
FIG. 3 is a schematic perspective view of a drying-kiln truck.

FIG. 3 shows a drying and kiln truck 25 in schematic form. The bogie 42 of the truck, whose wheels 43 run on rails 44, consists of steel and it is shielded at the top by a refractory covering 45. Refractory covering 45 has longitudinally-extending grooves 46, so that the setting layer 47 of brick blanks 21 can be subjected from below with hot air. Brick blanks 21 are laterally spaced and are also spaced one behind the other. On the side, combined drying and kiln trucks 25 are protected by sand aprons 48, which move in sand troughs 49 in the feed direction of the truck. Since the end faces of trucks 25 are arranged very close to each other in channels 30 and 34 or are in contact, it is not possible for the hot smoke gases to attack the steel bogie, because the gases practically do not come in contact with the bogie.

The plant according to the instant invention operates continuously as a closed system, with a high efficiency and low energy requirement. Operation can be fully automatic by means of suitable controls. If different kinds of brick are to be produced, it is possible to override the fully automatic control, for example, of the transfer trucks, so that different channels of the tunnel dryer or tunnel kiln can be charged. Since the dimensions of the component parts of the tunnel dryer and of the tunnel kiln are matched to each other, it is possible to employ standardized components whose manufacture and installation is moderately priced. The tunnel dryer or tunnel kiln can also be extended by means of these standardized components, so that a higher capacity can be obtained from the plant in a simple manner. Since the combined drying-kiln trucks continuously traverse through the plant, it follows that the energy requirement is uniform, and complicated monitoring and control systems are obviated. Intermediate layers, which reduce the channel dimensions, can be provided in order to maintain the channel height as constant as possible above the setting layer and thus to achieve optimum air velocity for drying, or the channel ceilings can be guided so that they can be lowered. Complicated setting grippers are obviated, since only one setting layer is employed, and finally, the blanks can be arranged in rows independently of their size, and such rows have not effect on the dimensions of the dryer or kiln. A standard dryer or standard kiln, which can be assembled from the previously-mentioned standardized components by the unit construction principle, can therefore be used for all kinds of brick.

While only a single embodiment of the present invention has been shown and described, it will be obvious to those persons of ordinary skill in the art, that many changes and modifications may be made thereunto, without departing from the spirit and scope of the invention.

What is claimed is:

1. A plant for continuously producing fired brick blanks, comprising:
 a material processing system for processing and producing brick blank raw material;
 a molding and shaping system for transforming the raw material into brick blanks, said molding and shaping system including a multiple wire cutter for cutting strand segments into brick blanks and a spacing belt coupled to the discharge end of said cutter for spacing said brick blanks in a predetermined spaced-apart manner;
 a drying and firing system for drying and firing the brick blanks, said drying and firing system comprising a tunnel dryer and a tunnel kiln which are disposed in a common casing; and
 means for interconnecting said systems to form a processing line, which permits continuous operation with the individual working operations following each other directly, said means including conveying devices, said conveying devices including conveyors for conveying brick blanks through said tunnel dryer in a first direction and then through said tunnel kiln in a reverse, counterflow direction.

2. The plant according to claim 1, wherein said material processing system comprises a material conveying unit for supplying raw material, a crushing unit for reducing and processing the raw material, a mixing unit for mixing the processed raw material with additives, and a storage unit for storing the mixed raw material, and conveyor belts for interconnecting said material conveying unit, crushing unit, mixing unit and storage unit in a processing line.

3. The plant according to claim 1, wherein said molding and shaping system comprises an extrusion press for transforming raw material into an extruded strand of material and a strand cutter coupled to the discharge end of said press for cutting said strand into strand segments, said multiple wire cutter being coupled to the discharge end of said strand cutter.

4. The plant according to claim 1, wherein said tunnel dryer and said tunnel kiln are disposed one above the other.

5. The plant according to claim 4, wherein said tunnel dryer and said tunnel kiln each comprises multi-row ducts, and wherein one duct of said tunnel dryer is associated with one duct of said tunnel kiln.

6. The plant according to claim 1, wherein said tunnel dryer and said tunnel kiln each defines at least one channel having a height which is dimensioned to permit passage therethrough of only one conveyor having only one layer of brick blanks thereon.

7. The plant according to claim 1, additionally including an air circulating system between said tunnel kiln and said tunnel dryer.

8. The plant according to claim 7, wherein said air circulating system includes fans for conducting the hot combustion gases of said tunnel kiln into said tunnel dryer by the counterflow principle for drying sensitive blanks.

9. The plant according to claim 7, wherein said air circulating system includes fans for conducting the hot combustion gases of said tunnel kiln into said tunnel dryer by an equal flow principle for blanks which are not sensitive to drying.

10. The plant according to claim 1, additionally including a push-off device and a conveying and distribution system coupled between said molding and shaping system, and said firing and drying system, said push-off device including means for transferring the brick blanks from said molding and shaping system to said conveying and distribution system, and a combined distribution and elevator system disposed between said tunnel dryer and said tunnel kiln at a feed end of said tunnel kiln for receiving brick blanks from said conveying and distributing system for conveying said brick blanks to and through said tunnel dryer and from said tunnel dryer to and through said tunnel kiln.

11. The plant according to claim 10, wherein said conveying and distribution system includes a plurality of combination drying-kiln trucks on which said bricks are deposited by means of said push-off device, and wherein said combined distribution and elevator system includes a plurality of transfer trucks on which said drying-kiln trucks are loaded.

12. The plant according to claim 11, additionally including guides which extend transversely to the direction of motion of said drying-kiln truck on which said transfer trucks are supported, and wherein said tunnel dryer includes a plurality of laterally adjoining channels, said channels being positioned so that said drying-kiln trucks can be fed into said channels without said trucks altering their direction or level of motion.

13. The plant according to claim 11, wherein said combined drying-kiln trucks are covered with a refractory covering which is provided on the top of the truck with groove-like profiling.

14. The plant according to claim 11, wherein said drying-kiln trucks include lateral heat shield devices supported thereon.

15. The plant according to claim 14, wherein said heat shield devices comprise sand aprons which move with the truck in its feed direction supported in guides.

16. The plant according to claim 15, wherein said guides comprise sand troughs.

17. The plant according to claim 5, additionally including intermediate layers for adjusting the duct cross-section.

18. The plant according to claim 5, additionally including adjustable duct ceilings for adjusting the duct cross-section.

* * * * *